(12) United States Patent
Zhang et al.

(10) Patent No.: US 11,206,119 B2
(45) Date of Patent: Dec. 21, 2021

(54) METHOD AND DEVICE FOR CODE BLOCK GROUPING

(71) Applicant: TELEFONAKTIEBOLAGET LM ERICSSON (PUBL), Stockholm (SE)

(72) Inventors: Zhan Zhang, Beijing (CN); Jinhua Liu, Beijing (CN); Shaohua Li, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 201 days.

(21) Appl. No.: 16/496,222

(22) PCT Filed: Mar. 9, 2018

(86) PCT No.: PCT/CN2018/078569
§ 371 (c)(1),
(2) Date: Sep. 20, 2019

(87) PCT Pub. No.: WO2018/171444
PCT Pub. Date: Sep. 27, 2018

(65) Prior Publication Data
US 2020/0059341 A1 Feb. 20, 2020

(30) Foreign Application Priority Data
Mar. 24, 2017 (WO) ................ PCT/CN2017/078141

(51) Int. Cl.
*H04L 5/00* (2006.01)
*H04W 72/04* (2009.01)

(52) U.S. Cl.
CPC .......... *H04L 5/0053* (2013.01); *H04L 5/0007* (2013.01); *H04L 5/0023* (2013.01); *H04L 5/0044* (2013.01); *H04W 72/042* (2013.01)

(58) Field of Classification Search
CPC ... H04L 5/0053; H04L 5/0007; H04L 5/0023; H04L 5/0044; H04L 1/1854;
(Continued)

(56) References Cited

U.S. PATENT DOCUMENTS 7,568,189 B2 7/2009 Suba et al.
8,514,897 B2 8/2013 Jiang
(Continued)

FOREIGN PATENT DOCUMENTS

CN 101335750 A 12/2008
CN 105281868 A 1/2016
(Continued)

OTHER PUBLICATIONS

Extended Search Report issued in corresponding European Application No. 18770222.0, dated Mar. 5, 2020, 14 pages.
(Continued)

*Primary Examiner* — Hardikkumar D Patel
(74) *Attorney, Agent, or Firm* — Rothwell, Figg, Ernst & Manbeck, P.C.

(57) ABSTRACT

A method and device for code block grouping. It is determined that one or more code blocks of a transport block is/are mapped to one or more code block groups according to a service and/or an associated channel; therefore, resource efficiency may be improved, latency may be reduced and robustness may be increased for all kinds of services.

20 Claims, 10 Drawing Sheets

(58) Field of Classification Search
CPC ... H04L 1/0006; H04L 1/1628; H04L 5/0055; H04L 1/1896; H04L 1/1861; H04L 1/1819; H04L 5/0082; H04L 1/189; H04L 1/1887; H04L 1/06; H04L 1/1867; H04L 1/005; H04L 1/0065; H04L 1/04; H04L 27/2647; H04L 1/0041; H04L 1/0061; H04L 25/0224; H04L 1/0071; H04L 5/0048; H04L 25/0204; H04L 1/0068; H04L 1/0003; H04L 1/0618; H04L 1/0026; H04W 72/042; H04W 28/10; H04W 28/22; H04W 72/0493; H04B 7/0413; H04B 1/7107; H04B 7/068; H04B 7/0439; H04B 7/0452; G06F 11/1004; H03M 13/09; H04J 11/004
See application file for complete search history.

(56) References Cited

U.S. PATENT DOCUMENTS

| | | | |
|---|---|---|---|
| 8,908,632 B2 * | 12/2014 | Pi | H04L 5/0016 370/330 |
| 9,236,918 B2 | 1/2016 | Toda et al. | |
| 9,525,513 B2 * | 12/2016 | Pi | H04L 1/0065 |
| 10,219,256 B2 * | 2/2019 | Yoo | H04L 1/1854 |
| 2011/0080975 A1 * | 4/2011 | Toda | H04L 1/1819 375/295 |
| 2014/0146763 A1 | 5/2014 | Khay-Ibbat et al. | |
| 2014/0219265 A1 | 8/2014 | Sarkar | |

FOREIGN PATENT DOCUMENTS

| | | |
|---|---|---|
| EP | 2139204 A1 | 12/2009 |
| EP | 3602894 A2 | 2/2020 |
| WO | 2009005407 A2 | 1/2009 |
| WO | 2018175887 A2 | 9/2018 |

OTHER PUBLICATIONS

Samsung "TB/CB Handling for eMBB" 3GPP TSG RAN WG1 NR Ad-Hoc Meeting, R1-1700958, Spokane, USA Jan. 16-20, 2017, 5 pages.

InterDigital Communications "Multi-bits HARQ feedback" 3GPP TSG RAN WG1 Meeting #88, R1-1702379, Athens, Greece, Feb. 13-17, 2017, 3 pages.

International Search Report and the Written Opinion of the International Searching Authority, issued in corresponding International Application No. PCT/CN2018/078569, dated Jun. 15, 2018, 10 pages.

Intel Corporation "On HARQ support for URLLC" 3GPP TSG RAN WG1 Meeting #86bis, R1-1609543, Lisbon, Portugal, Oct. 10-14, 2016, 5 pages.

* cited by examiner

METHOD AND DEVICE FOR CODE BLOCK GROUPING

CROSS REFERENCE TO RELATED APPLICATION(S)

This application is a 35 U.S.C. § 371 National Phase Entry Application from PCT/CN2018/078569, filed Mar. 9, 2018, designating the United States, and also claims the benefit of International Application No. PCT/CN2017/078141, filed Mar. 24, 2017, the disclosures of which are incorporated herein by reference in their entirety.

TECHNICAL FIELD

Embodiments of the present disclosure generally relate to the field of communications, and more particularly, to a method and device for code block grouping.

BACKGROUND

This section introduces aspects that may facilitate better understanding of the present disclosure. Accordingly, the statements of this section are to be read in this light and are not to be understood as admissions about what is in the prior art or what is not in the prior art.

In a LTE (long term evolution) system, data to be transmitted in a transmitting apparatus may be divided into one or more TBs (transport blocks); after an operation of TB CRC (cycle redundancy check) attachment, a CB (code block) segmentation may be performed.

At current RAN (radio access network) 1, there are some agreements on working assumption, such as, one or more CBs may be mapped into a CBG (code block group); and CBG-based transmission with single/multi-bit HARQ (hybrid automatic repeat request)-ACK (acknowledge) feedback is supported in Rel-15, which shall have the following characteristics:

For example, only CBG based (re)-transmission for the same TB of a HARQ process is allowed; a CBG may include all CBs of a TB regardless of the size of the TB, and in such case, a UE (user equipment) may report single HARQ-ACK bits for the TB; a CBG may include one CB; a granularity of the CBG is configurable.

On the other hand, eMBB (enhanced mobile broadband), URLLC (ultra-reliable and low-latency communication) and mMTC (massive machine type communication) are some cases defined in NR (new radio).

In some scenarios of URLLC traffic, both high reliability of communications and low latency are highly demanded. It may be appreciated that these requirements are mutually conflicting. Usually, the two aspects may be traded off for each other, i.e. it is relatively easy to achieve one aspect by trading-off the other, while for URLLC traffic both should be met simultaneously, which poses a remarkable challenge to UP (user-plane) design.

For example, the latency requirement for URLLC ranges from 1 ms to 10 ms for different scenarios, such as concrete applications ranging from automation applications, smart grid to intelligent transportation, while the reliability requirement for URLLC ranges from a residual error rate of $10^{-4}$ or $10^{-6}$, to $10^{-9}$.

Simultaneously achieving such high demands on both reliability and latency may impact many layers and components of both RAN and core network. URLLC may be regarded as a use case with extremely high QoS (Quality of Service) both in the RAN and the core network.

SUMMARY

However, it has been found that it is expected to improve resource efficiency, and reduce latency and increase robustness for all kinds of services (such as both eMBB data transmission and URLLC data transmission).

In order to solve at least part of the above problems, methods, apparatus, devices and computer programs are provided in the present disclosure. It can be appreciated that embodiments of the present disclosure are not limited to a wireless system operating in NR network, but could be more widely applied to any application scenario where similar problems exist.

Various embodiments of the present disclosure mainly aim at providing methods, devices and computer programs for controlling a transmission between a transmitter and a receiver, for example, in a shared frequency band. Either of the transmitter and the receiver could be, for example, a terminal device or a network device. Other features and advantages of embodiments of the present disclosure will also be understood from the following description of specific embodiments when reading in conjunction with the accompanying drawings, which illustrate, by way of example, the principles of embodiments of the present disclosure.

In general, embodiments of the present disclosure provide a solution for code block grouping. In which, one or more code blocks of a transport block is/are mapped to one or more code block groups according to a service and/or an associated channel; therefore, resource efficiency may be improved, latency may be reduced and robustness may be increased for all kinds of services.

In a first aspect, there is provided a method in a first device for code block grouping, includes: determining first configuration information on mapping of one or more code blocks to a code block group according to a service (or may be referred to as traffic) and/or an associated channel; and determining second configuration information on mapping of the code block group to one or more time-frequency resources.

In one embodiment, the method further includes: transmitting the first configuration information and/or the second configuration information to a second device.

In one embodiment, the method further includes: mapping one or more code blocks of a transport block to one or more code block groups according to the first configuration information; and/or mapping the one or more code block groups to one or more time-frequency resources according to the second configuration information.

In one embodiment, one or more of the following information is determined to be used to adjust the mapping of the code block and the code block group: the number of feedback bits, a granularity of a code block, a granularity of a code block group, the number of the code block groups in a transport block and the number of the code blocks in a code block group.

In one embodiment, the granularity of the code block group is determined based on configuration of a feedback control channel.

In one embodiment, the configuration of the feedback control channel includes a control channel capacity and/or a control channel type.

In one embodiment, the granularity of the code block group is determined based on configuration of the service corresponding to the code blocks.

In one embodiment, the configuration of the service includes a service type and/or a multiplexing status of the services.

In one embodiment, the mapping of the code block and the code block group is determined based on an experienced channel condition.

In one embodiment, the mapping of the code block and the code block group is determined according to a priority of the code block.

In one embodiment, a first code block group and a second code block group are determined respectively; and a first rule is defined for the first code block group and a second rule is defined for the second code block group.

In one embodiment, each code block group is mapped to an integer number of orthogonal frequency division multiplexing (OFDM) symbols in time domain.

In one embodiment, the method further includes: segmenting information bits of the transport block for each code block group.

In one embodiment, the method further includes: segmenting one or more time-frequency resources for each code block group.

In one embodiment, the method further includes: transmitting feedback information of a data transmission according to the mapping of the code block and the code block group, and/or, the mapping of the code block groups and the time-frequency resource.

In a second aspect, there is provided a method in a second device for code block grouping, includes: receiving first configuration information on mapping of one or more code blocks to a code block group from a first device; the first configuration information is determined by the first device according to a service and/or an associated channel.

In one embodiment, the method further includes: receiving second configuration information on mapping of the code block group to one or more time-frequency resources from the first device.

In one embodiment, the method further includes: mapping one or more code blocks of a transport block to one or more code block groups according to the first configuration information; and/or mapping the one or more code block groups to one or more time-frequency resources according to the second configuration information.

In one embodiment, the method further includes: segmenting information bits of the transport block for each code block group.

In one embodiment, the method further includes: segmenting one or more time-frequency resources for each code block group.

In one embodiment, the method further includes: transmitting feedback information of a data transmission according to the mapping of the code block and the code block group, and/or, the mapping of the code block groups and the time-frequency resource.

In a third aspect, there is provided a first device, comprising a processor and a memory, the memory containing instructions executable by the processor whereby the first device is operative to: determine first configuration information on mapping of one or more code blocks to a code block group according to a service and/or an associated channel; and determine second configuration information on mapping of the code block group to one or more time-frequency resources.

In one embodiment, the first device is operative to: transmit the first configuration information and/or the second configuration information to a second device.

In one embodiment, the first device is operative to: map one or more code blocks of a transport block to one or more code block groups according to the first configuration information; and/or map the one or more code block groups to one or more time-frequency resources according to the second configuration information.

In one embodiment, one or more of the following information is determined to adjust the mapping of the code block and the code block group: the number of feedback bits, a granularity of a code block, a granularity of a code block group, the number of the code block groups in a transport block and the number of the code blocks in a code block group.

In one embodiment, the granularity of the code block group is determined based on configuration of a feedback control channel.

In one embodiment, the configuration of the feedback control channel includes a control channel capacity and/or a control channel type.

In one embodiment, the granularity of the code block group is determined based on configuration of the service corresponding to the code blocks.

In one embodiment, the configuration of the service includes a service type and/or a multiplexing status of the services.

In one embodiment, the mapping of the code block and the code block group is determined based on an experienced channel condition.

In one embodiment, the mapping of the code block and the code block group is determined according to a priority of the code block.

In one embodiment, a first code block group and a second code block group are determined respectively; and a first rule is defined for the first code block group and a second rule is defined for the second code block group.

In one embodiment, each code block group is mapped to an integer number of symbols in time domain.

In one embodiment, the first device is operative to: segment information bits of the transport block for each code block group.

In one embodiment, the first device is operative to: segment one or more time-frequency resources for each code block group.

In one embodiment, the first device is operative to: transmit feedback information of a data transmission according to the mapping of the code block and the code block group, and/or, the mapping of the code block groups and the time-frequency resource.

In a fourth aspect, there is provided a second device, comprising a processor and a memory, the memory containing instructions executable by the processor whereby the second device is operative to: receive first configuration information on mapping of one or more code blocks to a code block group from a first device; the first configuration information is determined by the first device according to a service and/or an associated channel.

In one embodiment, the second device is operative to: receive second configuration information on mapping of the code block group to one or more time-frequency resources from the first device.

In one embodiment, the second device is operative to: map one or more code blocks of a transport block to one or more code block groups according to the first configuration information; and/or map the one or more code block groups to one or more time-frequency resources according to the second configuration information.

In one embodiment, the second device is operative to: segment information bits of the transport block for each code block group.

In one embodiment, the second device is operative to: segment one or more time-frequency resources for each code block group.

In one embodiment, the second device is operative to: transmit feedback information of a data transmission according to the mapping of the code block and the code block group, and/or, the mapping of the code block groups and the time-frequency resource In a fifth aspect, there is provided a communications system, comprising: a first device according to the third aspect and a second device according to the fourth aspect.

According to various embodiments of the present disclosure, it is determined that one or more code blocks of a transport block is/are mapped to one or more code block groups according to a service and/or an associated channel; therefore, resource efficiency may be improved, latency may be reduced and robustness may be increased for all kinds of services.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
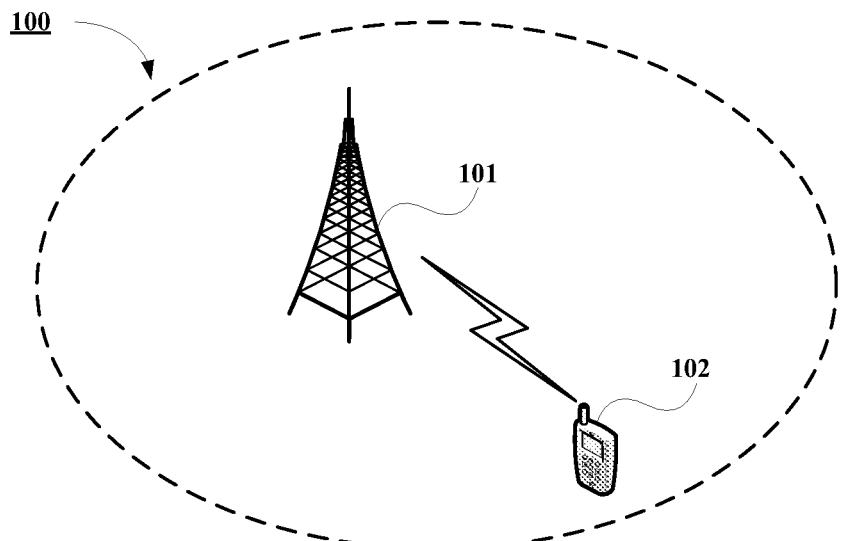
FIG. 1 is a schematic diagram which shows a wireless communication network.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth.

Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The term "first device" refers to a network device or terminal device, the "second device" refers to a network device or terminal device.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Now some exemplary embodiments of the present disclosure will be described below with reference to the figures.

FIG. 1 shows a schematic diagram of a wireless communication network 100. in which embodiments of the disclosure may be implemented. As shown in FIG. 1, the wireless communication network 100 may include one or more network devices, for example network devices 101. It will be appreciated that the network device 101 could also be in a form of gNB, Node B, eNB, BTS (Base Transceiver Station), and/or BSS (Base Station Subsystem), access point (AP) and the like. The network device 101 may provide radio connectivity to a set of terminal devices or UEs 102-1, 102-2, . . . , 102-N (collectively referred to as "terminal device(s) 102) within its coverage, where N is a natural number. In the example of FIG. 1, the network device 101 may provide services to the terminal device 102. The traffic between the network device 101 and the terminal device 102 may be URLLC (ultra-reliable and low latency communication) traffic, eMBB (enhanced mobile broadband) traffic, mMTC (massive machine type communication) traffic, and so on. Although network device 101 illustrated in the example wireless communication network may represent a device that includes a particular combination of hardware components, other embodiments may comprise network nodes with different combinations of components. It is to be understood that a network device may comprise any suitable combination of hardware and/or software needed to perform the tasks, features, functions and methods disclosed herein.

In this disclosure, some corresponding determined mapping methods and corresponding parameters may be instructed to the terminal device 102 by the network device 101 by sending signaling to the terminal device 102. Optionally, some corresponding determined mapping methods and corresponding parameters may be reported to the network device 101 by the terminal device 102.

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

In this disclosure, URLLC service and/or eMBB service will be illustrated as an example, but it is not limited thereto. The solution or method or apparatus of the present disclosure may also be applicable for other scenarios.

As illustrated above, only the concept of CBG is proposed in the existing scheme, there is no a scheme on how to map one or more CBs to a CBG, and it is expected to improve resource efficiency, and reduce latency and increase robustness for all kinds of services.

First Aspect of Embodiments

A method for code block grouping is provided in an embodiment. The method is implemented at a first device (such as a network device or a terminal device) as an example.

Figure 2:
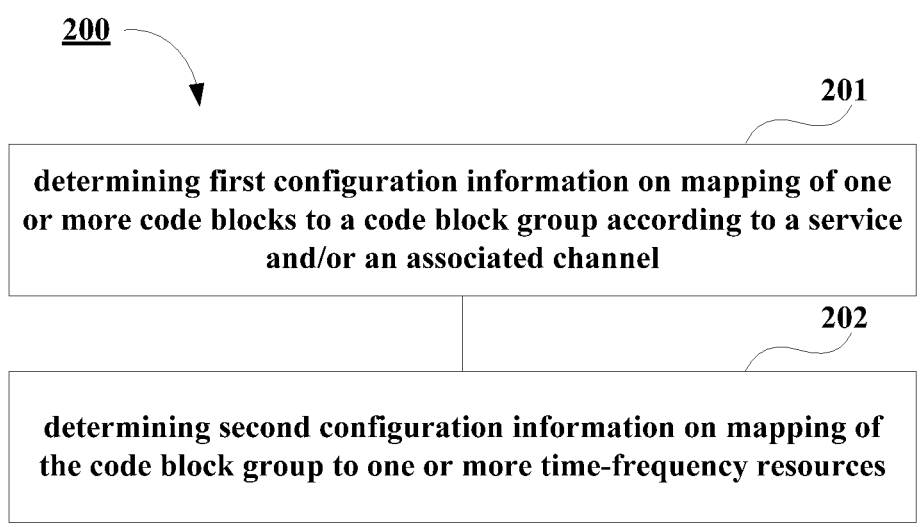
FIG. 2 is a diagram which shows a method for code block grouping in accordance with an embodiment of the present disclosure.

FIG. 2 is a diagram which shows a method 200 for code block grouping in accordance with an embodiment of the present disclosure, and illustrates the method for code block grouping by taking a network device (such as a gNB) as an example.

As shown in FIG. 2, the method 200 includes, determining first configuration information on mapping of one or more code blocks to a code block group according to a service and/or an associated channel (for example, it may be referred to as a feedback channel), at block 201; and determining second configuration information on mapping of the code block group to one or more time-frequency resources, at block 202.

In an embodiment, the first device may initiate a data transmission procedure. In which, one or more code blocks of a transport block may be mapped to one or more code block groups according to the first configuration information, and/or, the one or more code block groups may be mapped to one or more time-frequency resources (such as resource element (RE)) according to the second configuration information.

In an embodiment, the first device may be a decider or determiner of the mapping of CB to CBG and/or the mapping CBG to resource. The first device may be a network device (such as a gNB), and it may also transmit data to the second device (such as UE). The first device may also transmit the configuration information on the mapping to the second device, so that the second device may transmit data to the first device (or other apparatus).

In an embodiment, for example, the mapping may indicate that how a CBG consists of one or several CB(s) by selecting CBs among many to form a CBG in a transport block (TB), and/or, may specify which physical resource element(s) are used by a CBG at synthesizing a signal to be transmitted at a OFDM based radio transmitter. But it is not limited thereto.

Figure 3:
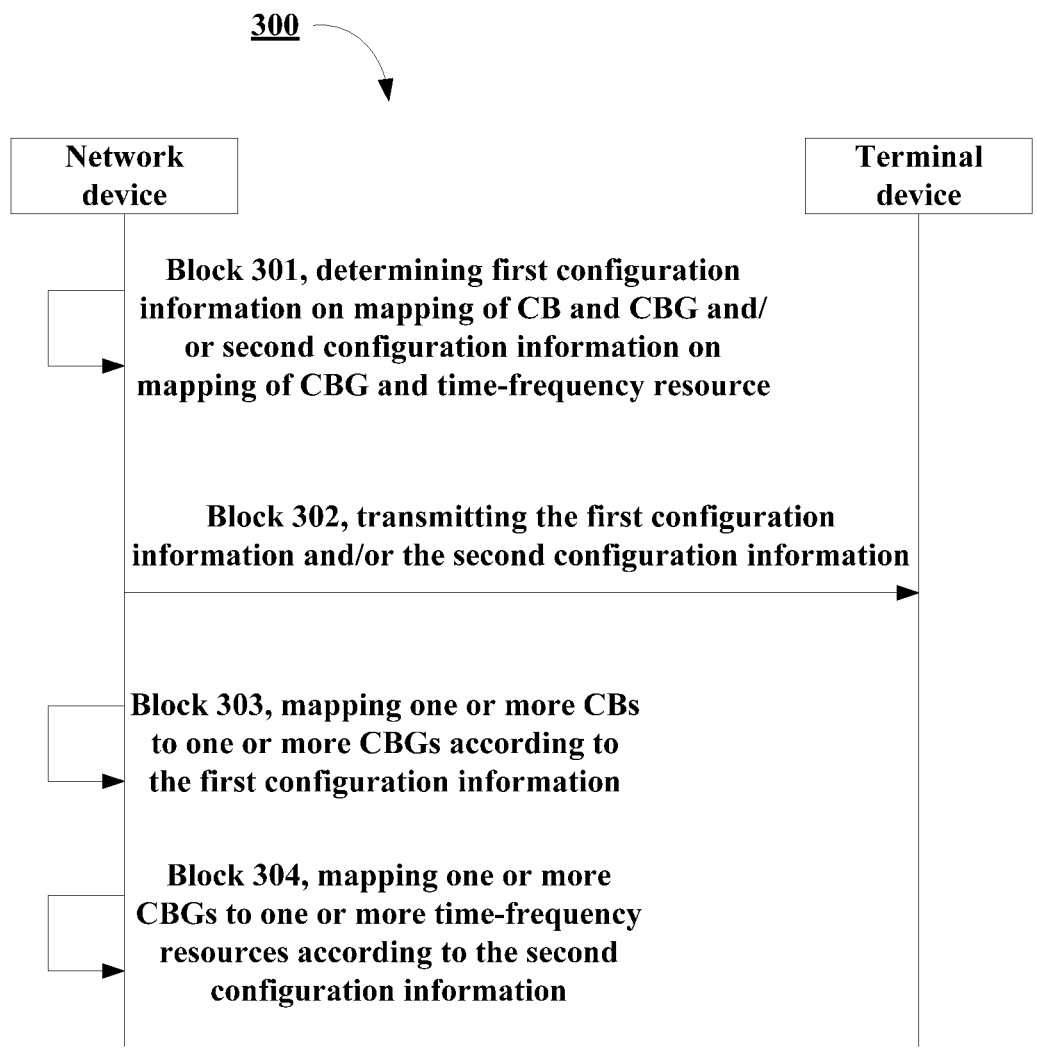
FIG. 3 is another diagram which shows a method for code block grouping in accordance with an embodiment of the present disclosure.

FIG. 3 is a diagram which shows a method 300 for code block grouping in accordance with an embodiment of the present disclosure, and illustrates the method for code block grouping by taking a network device and a terminal device as an example.

As shown in FIG. 3, the method 300 includes determining, by the network device, first configuration information on mapping of one or more code blocks to a code block group according to a service and/or an associated channel, and/or, second configuration information on mapping of the code block group to one or more time-frequency resources, at block 301;

As shown in FIG. 3, the method 300 may further include transmitting, by the network device to the terminal device, the first configuration information and/or the second configuration information, at block 302.

As shown in FIG. 3, the method 300 may further include mapping, by the network device, one or more code blocks of a transport block to one or more code block groups according to the first configuration information, at block 303.

As shown in FIG. 3, the method 300 may further include mapping, by the network device, the one or more code block groups to one or more time-frequency resources according to the second configuration information, at block 304.

In the example as illustrated in FIG. 3, the network device may transmit data as a transmitting apparatus, and the network device may determine the configuration information and send it to the terminal device.

In an embodiment, the first configuration information may include some mapping methods and/or mapping parameters related to the relationship of the CBs and CBGs; the second configuration information may include some mapping methods and/or mapping parameters related to the relationship of the CBGs and resources. But it is not limited thereto, other information may also be adopted according to an actual scenario.

In another example, the terminal device may transmit data as a transmitting apparatus, and the network device may determine the configuration information and send it to the terminal device.

Figure 4:
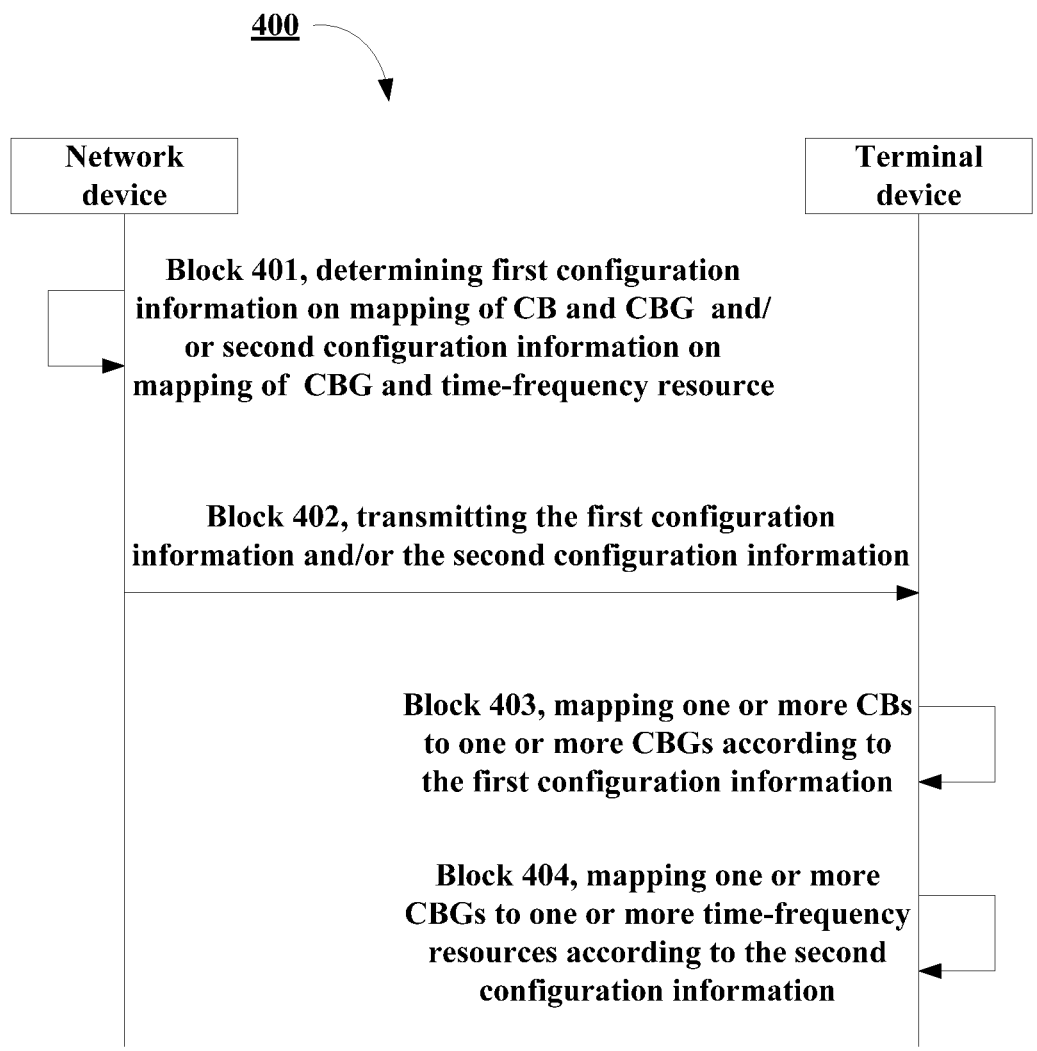
FIG. 4 is another diagram which shows a method for code block grouping in accordance with an embodiment of the present disclosure.

FIG. 4 is a diagram which shows a method 400 for code block grouping in accordance with an embodiment of the present disclosure, and illustrates the method for code block grouping by taking a network device and a terminal device as an example.

As shown in FIG. 4, the method 400 includes determining, by the network device, first configuration information on mapping of one or more code blocks to a code block group according to a service and/or an associated channel, and/or, second configuration information on mapping of the code block group to one or more time-frequency resources, at block 401.

As shown in FIG. 4, the method 400 may further include transmitting, by the network device to the terminal device, the first configuration information and/or the second configuration information, at block 402.

As shown in FIG. 4, the method 400 may further include mapping, by the terminal device, one or more code blocks of a transport block to one or more code block groups according to the first configuration information, at block 403.

As shown in FIG. 4, the method 400 may further include mapping, by the terminal device, the one or more code block groups to one or more time-frequency resources according to the second configuration information, at block 404.

It should be appreciated that FIGS. 3 and 4 are only examples of the disclosure, but it is not limited thereto. For example, the order of operations at blocks may be adjusted and/or some blocks may be omitted (for example, a data transmission procedure is omitted). Moreover, some blocks not shown in FIGS. 3 and 4 may be added.

In an embodiment, the first configuration information and/or the second configuration information may be transmitted via a radio resource control (RRC) signal, or may be transmitted via a MAC CE; but it is not limited thereto, other manners may also be adopted according to an actual scenario.

It should be appreciated that it is not limited thereto in the disclosure. For example, the first configuration information and/or the second configuration information may also be determined by the terminal device. For another example, the first configuration information and/or the second configuration information may also be transmitted by the terminal device to other apparatus.

In an embodiment, the relationship between CBs and CBGs may be defined by mapping one or more CBs to a CBG, such that resource efficiency may be improved for all kinds of services; but it is not limited thereto.

In an embodiment, one or more of the following information may be determined to adjust the mapping of the code block and the code block group: the number of feedback bits, a granularity (such as size and/or length) of a code block, a granularity of a code block group, the number of the code block groups in a transport block and the number of the code blocks in a code block group.

It should be appreciated that the above information is only examples of the disclosure, but it is not limited thereto. For example, other information may be adopted according to the actual scenario.

In an embodiment, the granularity of the code block group may be determined based on configuration of the associated channel corresponding to the code blocks. The mapping of the code block and the code block group may be configurable and adjustable. The mapping of the code block and the code block group may be associated with the configuration of an associated channel, such as, a channel capacity and/or a channel type. The associated channel may be a feedback control channel, such as a physical uplink control channel (PUCCH) carrying HARQ ACK/NACK. As another example, the associated channel may be a physical downlink control channel (PDCCH). However, it is not limited thereto, for example, the associated channel may be other control channels, such as a Prose control channel.

For example, when the control channel capacity is large, the granularity (size or/and length) of the CBG may be smaller, and when the control channel capacity is small, the granularity of CBG may be larger.

For another example, when the channel type is a physical uplink control channel (PUCCH), the granularity (size or/and length) of the CBG may be smaller, and when the channel type is a physical uplink shared channel (PUSCH), the granularity of CBG may be larger.

It should be appreciated that the above configuration of the control channel is only examples of the disclosure, but it is not limited thereto. For example, other information or configuration may be adopted according to the actual scenario.

In an embodiment, the granularity of the code block group may be determined based on configuration of the service corresponding to the code blocks. The mapping of the code block and the code block group may be configurable and adjustable. The mapping of the code block and the code block group may be associated with the configuration of a service, such as, a service type and/or a multiplexing status of the service.

For example, for a certain high QoS service, such as URLLC service, more control channel resources may preferably be allocated to the device in order to guarantee a sufficient feedback resource, thus the granularity of the CBG may become smaller. Such that the resources may facilitate a timely and accurate feedback.

While in a case that the granularity of the CBG is large for the URLLC service, an error of a CBG (or CB) may cause a request to retransmit the whole TB even when some CBGs (or CBs) are correctly decoded in most of time such an insufficient feedback may lead to unnecessary data abandoning and retransmission. Hence, this may cause unnecessary latency.

For another example, for other service such as eMBB service, less control resources may preferably be allocated to the device. That is to say, the granularity of the CBG may be large for the eMBB service.

For another example, if some important data such as media access control (MAC) control element (CE) are included in the information to be transmitted, it is also preferable to have an abundant feedback resource allocation (for example, the granularity of the CBG may be smaller) to guarantee that the important data may be transmitted effectively and feedback information of the important data may be received timely.

For another example, when the URLLC service is allowed to preempt (may be referred to as occupy) resources of the eMBB service, the granularity of the CBG may be smaller and more feedback bits may be used for the feedback of the eMBB service. As another example, the preemption (such as the URLLC service will preempt the resources of the eMBB service) is more frequent, the granularity of CBG used for the eMBB service may be smaller, etc.

In an embodiment, with the change of feedback bits and/or the granularity of the CBG, the granularity (size and/or length) of the code block may also be changed to adjust the mapping of the CB and the CBG.

For example, if the length of the CB is shorter, more CBGs may appear in a TB and the number of feedback bits corresponding to each of CBG for feedback may be larger. In a larger number of CBGs for a same length of total bit sequence for a TB, the data transmission rate is higher. The reason is that, feedback may be more accurate to identify error of the shorter CBGs so that unnecessary retransmission for the CBs without an error could be minimized as much as possible. Therefore, it is necessary to increase the feedback bits and reduce the length of the CBG in a total TB as much as possible. Such that data transmission performance and overall throughput may be increased eventually.

In an embodiment, the mapping of the code block and the code block group may be determined based on an experienced (or occurred) channel condition. In this embodiment, one or more CBs may be grouped based on one or more experienced channel condition.

For example, for one or more CBs to be grouped to a CBG, grouping the CBs which may suffer from preemption by other data into a first CBG with a first granularity and grouping the CBs which may not be preempted by other data into a second CBG with a second granularity.

For example, resources of CB 1 and CB 2 are allocated for eMBB service, however the resources are often preempted by URLLC service (this may mean an experience channel condition), so that CB1 and CB 2 may be grouped into CBG 1 (the granularity is small); other CBs such as CB 3 and CB 4 may be grouped into CBG 2 (the granularity is large).

Figure 5:
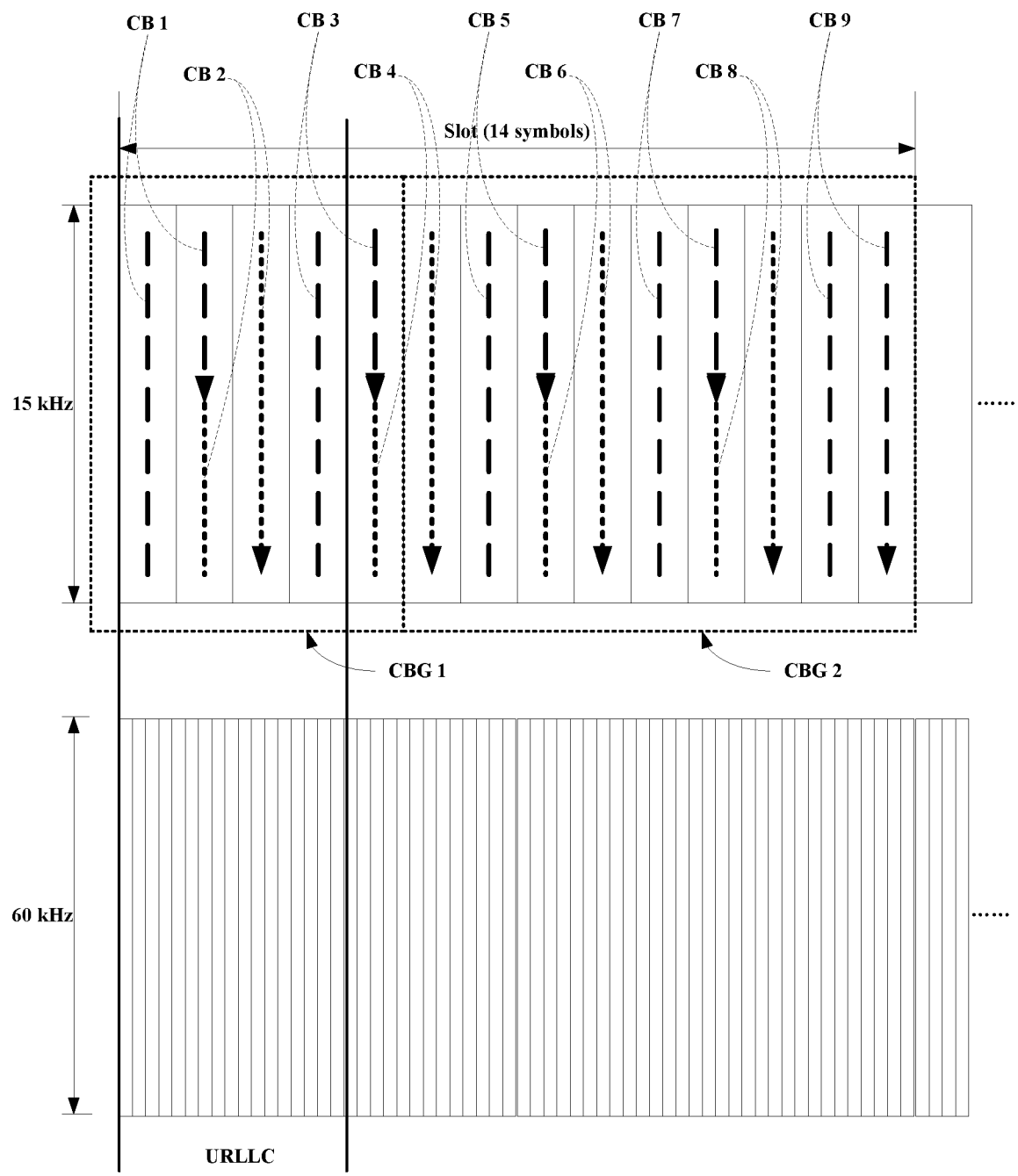
FIG. 5 is a diagram which shows an example of code block grouping based on preemption status in accordance with an embodiment of the present disclosure.

FIG. 5 is a diagram which shows an example of code block grouping based on preemption status in accordance with an embodiment of the present disclosure.

As shown in FIG. 5, for example, 9 code blocks (CB 1 to CB 9 as shown in FIG. 5) are transmitted. For example, CB 1 is transmitted in symbol 0 and symbol 1, etc. furthermore, the URLLC service may preempt the eMBB service from symbol 0-3 with 15 KHz subcarrier spacing. Thus, CB 1 to CB 3 may be preempted, the performance is expected to be improved.

Thus, CB 1 to CB 3 may be grouped to form a CBG 1, and other code blocks may be grouped to form a CBG 2, as shown by the dot rectangle in FIG. 5. The preemption may be dynamically changed, and it may lead to the mapping of the CB to the CBG may also be dynamically changed.

In an embodiment, a first code block group and a second code block group may be determined respectively; and a first rule may be defined for the first code block group and a second rule may be defined for the second code block group.

In this embodiment, the mapping of the code block and the code block group may be determined according to a priority of the code block. For example, a certain part of TB may be prioritized via the mapping of the CB and the CBG.

For example, a first CBG having individual feedback bit may be configured to improve the latency and throughput and the remaining CBs may be configured to form a plurality of second CBGs, and each of the second CBG has to have a joint feedback bit.

In a MAC sublayer, if a logical channel with a high QoS data is always putted in a heading part of CBGs of a TB, then the above prioritizing may provide a means of uneven protection on the high QoS data without inter-sublayer association or coordination.

For another example, the first CBG may include a plurality of CBs, and the remaining CBs may be equally distributed to the remaining CBGs.

Figure 6:
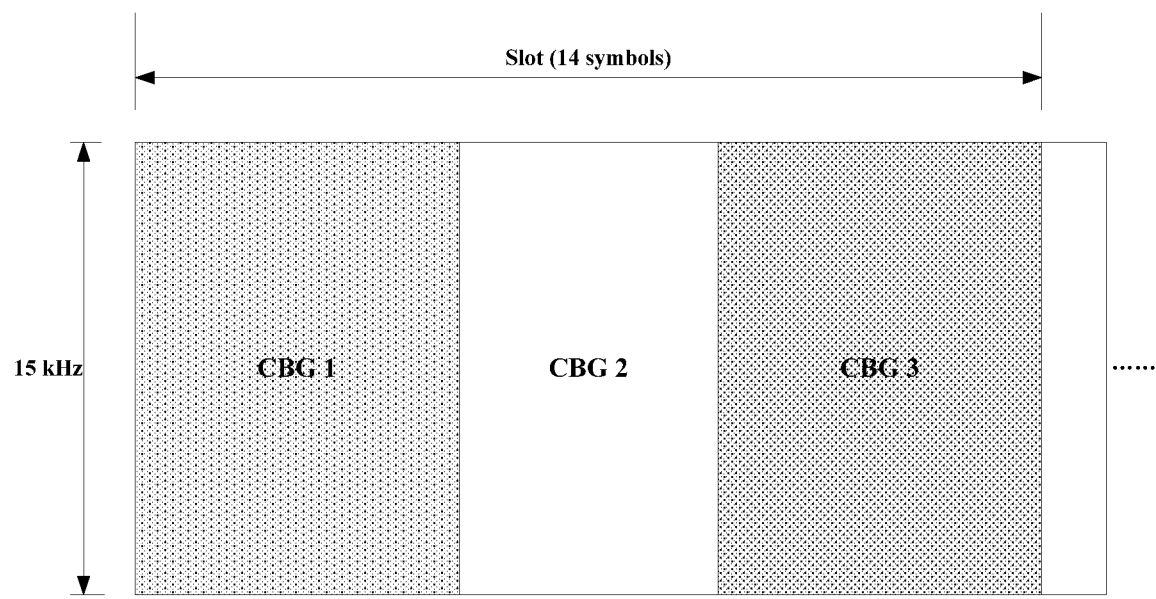
FIG. 6 is a diagram which shows an example of code block grouping based on a priority of CB in accordance with an embodiment of the present disclosure.

FIG. 6 is a diagram which shows an example of code block grouping based on prioritization (such as a priority of CB) in accordance with an embodiment of the present disclosure.

As shown in FIG. 6, for example, the first CBG (CBG 1) only includes one CB (CB 1) and other CBG includes four CBs. Such as, CBG 2 includes CB 2, CB 3, CB 4 and CB 5; CBG 3 includes CB 6, CB 7, CB 8 and CB 9; CBG 4 includes CB 10, CB 11, CB 12 and CB 13.

In an embodiment, each code block group may be mapped to an integer number of symbols in time domain. The symbols may be an orthogonal frequency division multiplexing (OFDM) symbol, but it is not limited thereto, other symbols may be adopted according to the actual scenario. In this embodiment, the boundary of a CBG may be aligned with the OFDM symbols.

Figure 7:
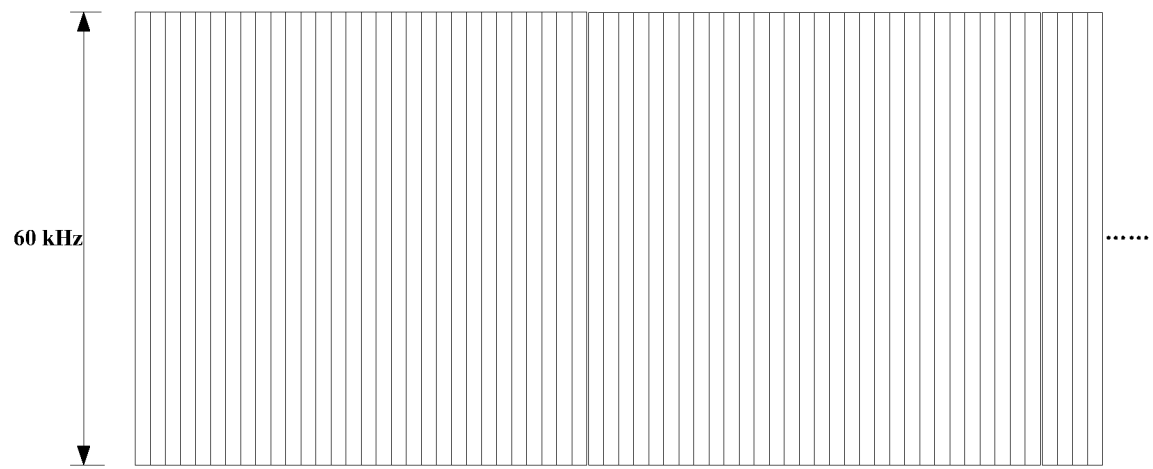
FIG. 7 is a diagram which shows an example of resource mapping for a code block group in accordance with an embodiment of the present disclosure.

FIG. 7 is a diagram which shows an example of resource mapping for a code block group in accordance with an embodiment of the present disclosure.

As shown in FIG. 7, it is assumed that 14 OFDM symbols are configured in one transmission time interval (TTI), and three CBGs are configured in the current TTI. According to the resource mapping method in this disclosure, five OFDM symbols may be configured for CBG 1, four OFDM symbols may be configured for CBG 2 and five OFDM symbols may be configured for CBG 3.

It should be appreciated that the mapping is only an example of the disclosure, but it is not limited thereto. For example, 5, 5, 4 OFDM symbols may be configured for CBG 1, CBG 2, and CBG 3, respectively, etc.

In this embodiment, the benefit to have integer number of OFDM symbols for a CBG may include that the preemption impact from URLLC service to eMBB service is reduced.

It should be appreciated that only operations related to this disclosure are illustrated in some embodiments. For the sake of simplicity, detail description of other operations, such as TB CRC attachment, code block segmentation, channel coding, are not illustrated in this disclosure.

Figure 8:
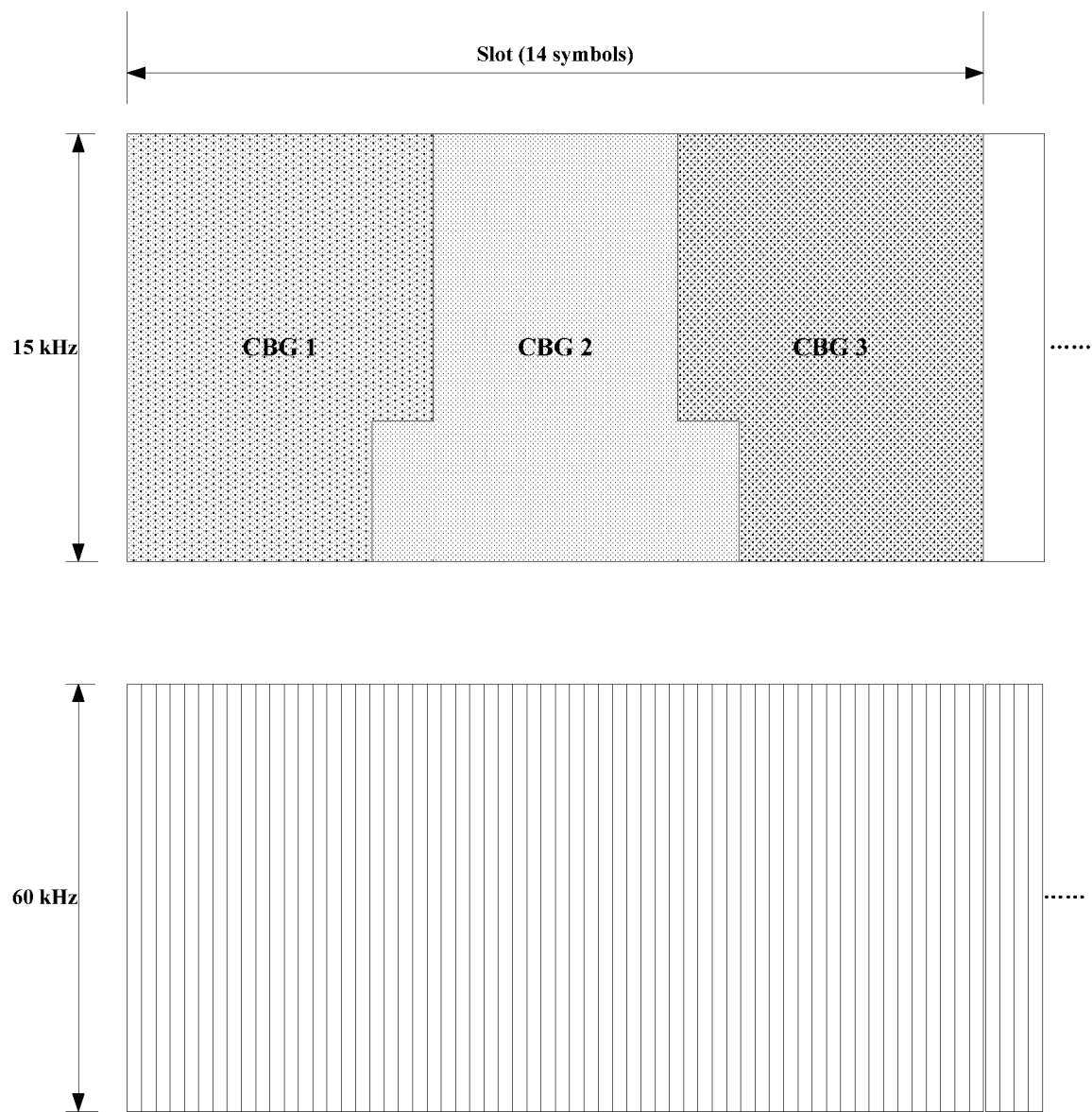
FIG. 8 is a diagram which shows an example of resource mapping for a code block group in relevant art.

For example, one resource mapping method may be that the resources are equally distributed in the CBG. FIG. 8 is a diagram which shows an example of resource mapping for a code block group in relevant art.

As shown in FIG. 8, about 14/3 OFDM symbols are allocated for each CBG. When eMBB service is preempted by URLLC service, for example, when the 17~20$^{th}$ OFDM symbol with 60 kHz subcarrier spacing are used for URLLC service, the 6$^{th}$ OFDM symbol with 15 kHz subcarrier spacing for eMBB service will be contaminated (also may be referred to as interfere) by the URLLC service.

As shown in FIG. 8, since the 6$^{th}$ OFDM symbol with 15 KHz subcarrier spacing cross CBG 1 and CBG 2, "NACK" for both CBG 1 and CBG 2 may be fed back by the receiving apparatus. Thus, the transmitting apparatus needs to retransmit all the code blocks in CBG 1 and CBG 2, thus, it is very inefficient for the transmission.

However, as for the solution such as shown in FIG. 7 in this disclosure, only "CBG 1" is contaminated (also may be referred to as interfere) and the code blocks of CBG 2 are not needed to be retransmitted, which is much more efficient for the transmission.

In an embodiment, the method may further include that segmenting information bits of the transport block for each code block group, and/or, segmenting one or more time-frequency resources for each code block group.

For example, the information bits are segmented for each CBG. As one example for the segmentation, the number of bits are proportional to the number of REs allocated for each CBG.

As one example, it is assumed N information bits are transmitted, then the number of bits for CBG 1, CBG 2, CBG 3 may be 5/14*N, 4/14*N and 5/14*N, respectively. For each CBG, the information may be further segmented into different code blocks. The purpose may be keeping coding rate for each code block almost equally. Thus, the performance may be improved. With this way, it can simplify the coding design.

It should be appreciated that segmenting information bits for each code block group may be optional. Without this segmenting, the information bits may be segmented into code blocks as conventional ways.

For another example, one or more time-frequency resources (such as REs) may be segmented for each CBG. As one example, each code block group may be mapped to an integer number of symbols in time domain.

In an embodiment, the method may further include: transmitting feedback information of a data transmission according to the mapping of the code block and the code block group, and/or, the mapping of the code block groups and the time-frequency resource.

For example, the first device (as a receiving apparatus or a receiver) may observe the mapping of the code block and the code block group and/or the mapping of the code block group and the time-frequency resource, whenever conducting a feedback on the detection results to the second device (as a transmitting apparatus or a transmitter).

It should be appreciated that the embodiments are only examples of the disclosure, but it is not limited thereto. Furthermore, the embodiments may be applied individually, or two or more embodiments may be combined according to the actual scenario.

As can be seen from the above embodiments, it is determined that one or more code blocks of a transport block is/are mapped to one or more code block groups according to a service and/or an associated channel; therefore, resource efficiency may be improved, latency may be reduced and robustness may be increased for all kinds of services.

Second Aspect of Embodiments

A method for code block grouping is provided in an embodiment. The method is implemented at a second device (such as a network device or a terminal device) as an example, and the same contents as those in the first aspect of embodiments are omitted.

Figure 9:
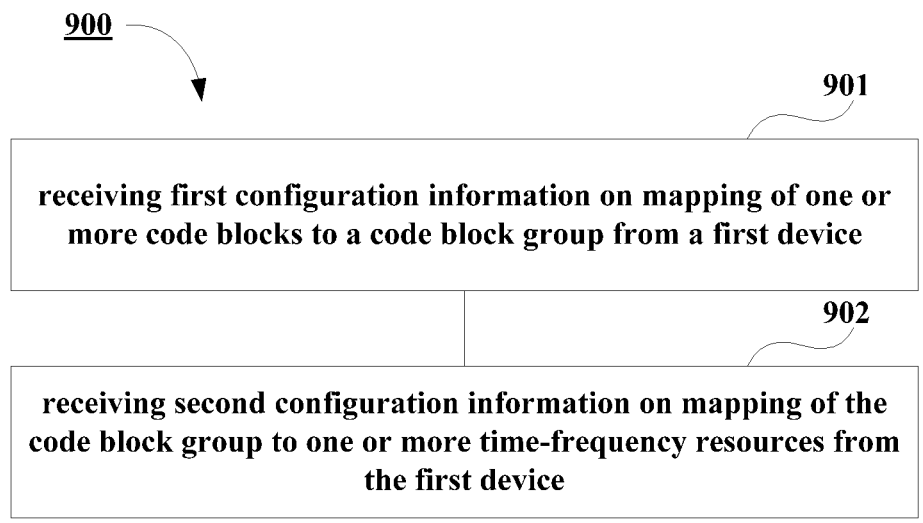
FIG. 9 is another diagram which shows a method for code block grouping in accordance with an embodiment of the present disclosure.

FIG. 9 is a diagram which shows a method 900 for code block grouping in accordance with an embodiment of the present disclosure, and illustrates the method for code block grouping by taking a terminal device (such as UE) as an example.

As shown in FIG. 9, the method 900 includes: receiving first configuration information on mapping of one or more code blocks to a code block group from a first device, at block 901; the first configuration information is determined by the first device according to a service and/or an associated channel.

As shown in FIG. 9, the method 900 may further include: receiving second configuration information on mapping of the code block group to one or more time-frequency resources from the first device, at block 902.

In an embodiment, the method may further include: mapping one or more code blocks of a transport block to one or more code block groups according to the first configuration information; and/or mapping the one or more code block groups to one or more time-frequency resources according to the second configuration information.

In an embodiment, the method may further include: segmenting information bits of the transport block for each code block group, and/or, segmenting one or more time-frequency resources for each code block group.

In an embodiment, the method may further include: transmitting feedback information of a data transmission according to the mapping of the code block and the code block group, and/or, the mapping of the code block groups and the time-frequency resource.

For example, the second device (as a receiving apparatus or a receiver) may observe the mapping of the code block and the code block group and/or the mapping of the code block group and the time-frequency resource, whenever conducting a feedback on the detection results to the first device (as a transmitting apparatus or a transmitter).

As can be seen from the above embodiments, it is determined that one or more code blocks of a transport block is/are mapped to one or more code block groups according to a service and/or an associated channel; therefore, resource efficiency may be improved, latency may be reduced and robustness may be increased for all kinds of services.

Third Aspect of Embodiments

An apparatus for code block grouping is provided in an embodiment. The apparatus may be configured in a first device (such as the network device 101 and/or the terminal device 102), and the same contents as those in the first aspect of embodiments are omitted.

Figure 10:
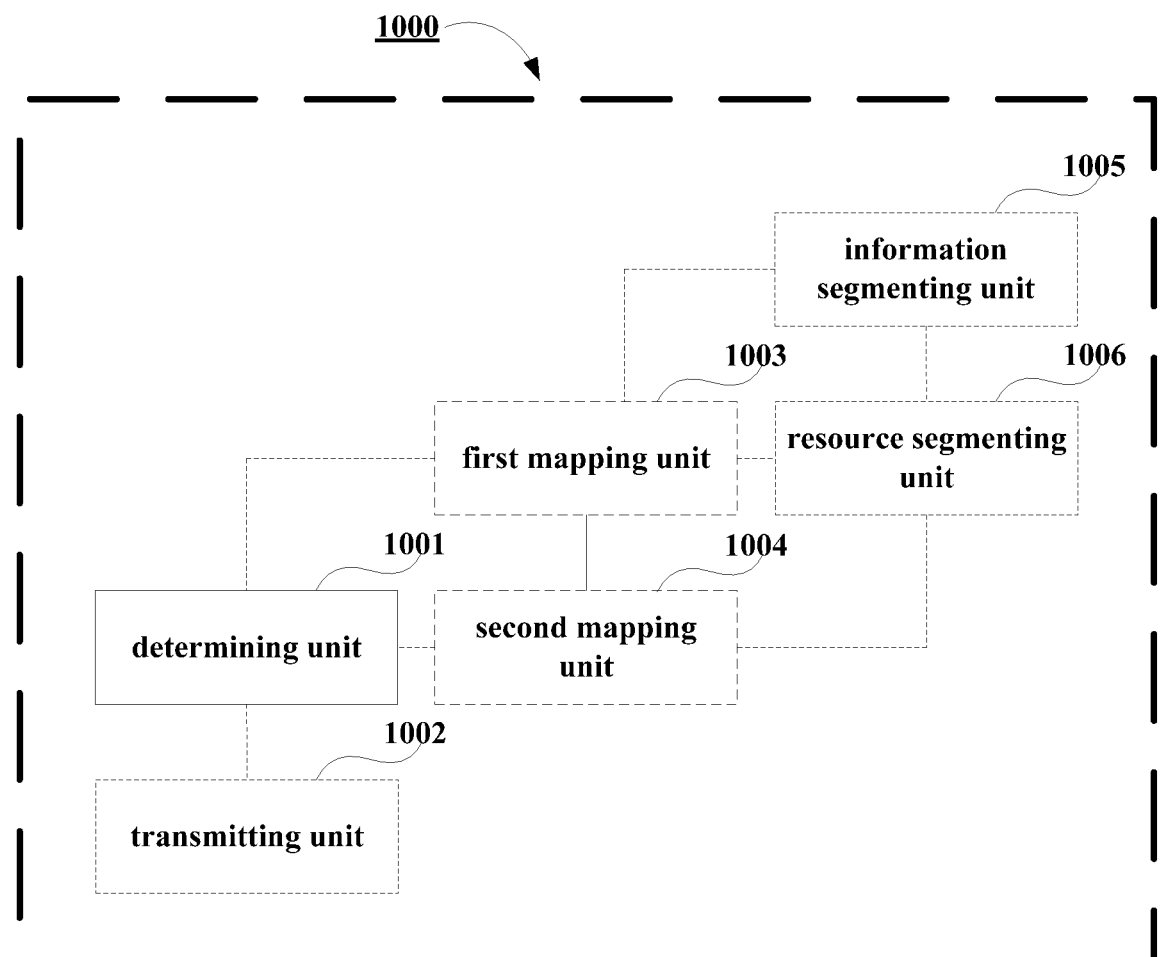
FIG. 10 is a block diagram which shows an apparatus for code block grouping in accordance with an embodiment of the present disclosure.

FIG. 10 shows a block diagram of an apparatus 1000 for code block grouping in accordance with an embodiment of the present disclosure.

As shown in FIG. 10, the apparatus 1000 includes: a determining unit 1001 configured to determine first configuration information on mapping of one or more code blocks to a code block group according to a service and/or an associated channel; and determine second configuration information on mapping of the code block group to one or more time-frequency resources.

In an embodiment, as shown in FIG. 10, the apparatus 1000 may further include: a transmitting unit 1002 configured to transmit the first configuration information and/or the second configuration information to a second device.

In an embodiment, as shown in FIG. 10, the apparatus 1000 may further include: a first mapping unit 1003 configured to map one or more code blocks of a transport block to one or more code block groups according to the first configuration information; and a second mapping unit 1004 configured to map the one or more code block groups to one or more time-frequency resources according to the second configuration information.

In an embodiment, one or more of the following information may be determined to adjust the mapping of the code block and the code block group: the number of feedback bits, a granularity of a code block, a granularity of a code block group, the number of the code block groups in a transport block and the number of the code blocks in a code block group. However, it is not limited thereto.

In an embodiment, the granularity of the code block group may be determined based on configuration of an associated channel. For example, the configuration of the associated channel may comprise a channel capacity and/or a channel type.

In an embodiment, the granularity of the code block group may be determined based on configuration of the service corresponding to the code blocks. For example, the configuration of the service may include a service type and/or a multiplexing status of the services.

In an embodiment, the mapping of the code block and the code block group may be determined based on an experienced channel condition.

In an embodiment, the mapping of the code block and the code block group may be determined according to a priority of the code block.

In an embodiment, a first code block group and a second code block group may be determined respectively; and a first rule is defined for the first code block group and a second rule is defined for the second code block group.

In an embodiment, each code block group may be mapped to an integer number of orthogonal frequency division multiplexing (OFDM) symbols in time domain.

In an embodiment, as shown in FIG. 10, the apparatus 1000 may further include: an information segmenting unit 1005 configured to segment information bits of the transport block for each code block group.

In an embodiment, as shown in FIG. 10, the apparatus 1000 may further include: a resource segmenting unit 1006 configured to segment one or more time-frequency resources for each code block group.

It should be appreciated that components included in the apparatus 1000 correspond to the operations of the method 200, 300 or 400. Therefore, all operations and features described above with reference to FIGS. 2-4 are likewise applicable to the components included in the apparatus 1000 and have similar effects. For the purpose of simplification, the details will be omitted.

It should be appreciated that the components included in the apparatus 1000 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 1000 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 1000 may be a part of a device. But it is not limited thereto, for example, the apparatus 1000 may be the network device 101 or the terminal device 102; other parts of the network device 101 or the terminal device 102, such as transmitter and receiver, are omitted in the FIG. 10.

As can be seen from the above embodiments, it is determined that one or more code blocks of a transport block is/are mapped to one or more code block groups according to a service and/or an associated channel; therefore, resource efficiency may be improved, latency may be reduced and robustness may be increased for all kinds of services.

Fourth Aspect of Embodiments

An apparatus for code block grouping is provided in an embodiment. The apparatus may be configured in a second device (such as the network device 101 and/or the terminal device 102), and the same contents as those in the second aspect of embodiments are omitted.

Figure 11:
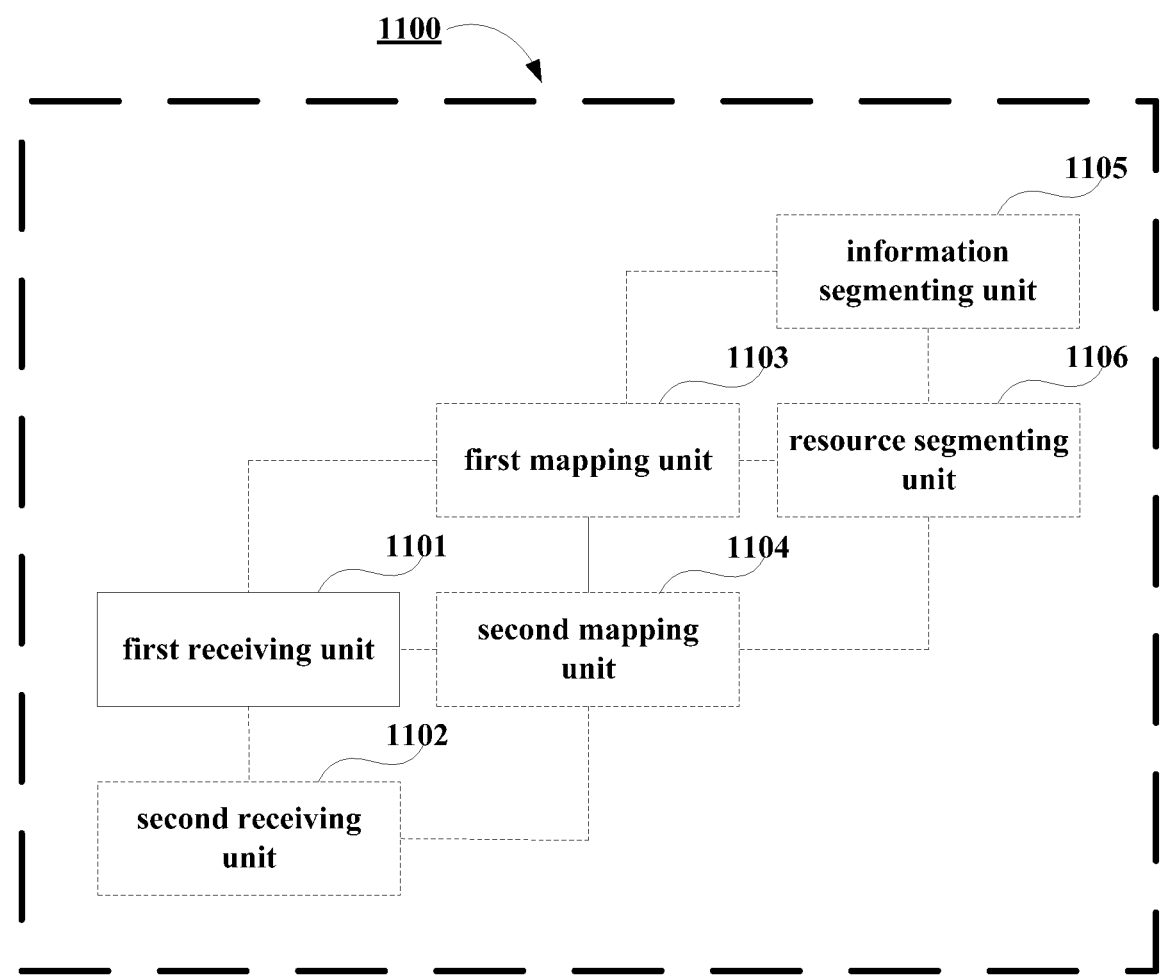
FIG. 11 is another block diagram which shows an apparatus for code block grouping in accordance with an embodiment of the present disclosure.

FIG. 11 shows a block diagram of an apparatus 1100 for code block grouping in accordance with an embodiment of the present disclosure.

As shown in FIG. 11, the apparatus 1100 includes: a first receiving unit 1101 configured to receive first configuration information on mapping of one or more code blocks to a code block group from a first device; the first configuration information is determined by the first device according to a service and/or an associated channel.

In an embodiment, as shown in FIG. 11, the apparatus 1100 may further include: a second receiving unit 1102 configured to receive second configuration information on mapping of the code block group to one or more time-frequency resources from the first device.

In an embodiment, as shown in FIG. 11, the apparatus 1100 may further include: a first mapping unit 1103 configured to map one or more code blocks of a transport block to one or more code block groups according to the first configuration information; and a second mapping unit 1104 configured to map the one or more code block groups to one or more time-frequency resources according to the second configuration information.

In an embodiment, as shown in FIG. 11, the apparatus 1100 may further include: an information segmenting unit 1105 configured to segment information bits of the transport block for each code block group.

In an embodiment, as shown in FIG. 11, the apparatus 1100 may further include: a resource segmenting unit 1106 configured to segment one or more time-frequency resources for each code block group.

It should be appreciated that components included in the apparatus 1100 correspond to the operations of the method 900. Therefore, all operations and features described above with reference to FIG. 9 are likewise applicable to the components included in the apparatus 1100 and have similar effects. For the purpose of simplification, the details will be omitted.

It should be appreciated that the components included in the apparatus 1100 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 1100 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 1100 may be a part of a device. But it is not limited thereto, for example, the apparatus 1100 may be the network device 101 or the terminal device 102, other parts of the network device 101 or the terminal device 102, such as transmitter and receiver, are omitted in the FIG. 11.

As can be seen from the above embodiments, it is determined that one or more code blocks of a transport block is/are mapped to one or more code block groups according to a service and/or an associated channel; therefore, resource efficiency may be improved, latency may be reduced and robustness may be increased for all kinds of services.

Fifth Aspect of Embodiments

A communications system is provided, as shown in FIG. 1, the communication system 100 includes network device 101 and a terminal device 102; the network device 101 may be configured to perform a method for code block grouping according to the first aspect of embodiments; or the terminal device 102 may be configured to perform a method for code block grouping according to the second aspect of embodiments.

A device (such as a terminal device 102 or a network device 101) is provided in an embodiment, and the same contents as those in the first aspect and the second aspect of embodiments are omitted.

Figure 12:
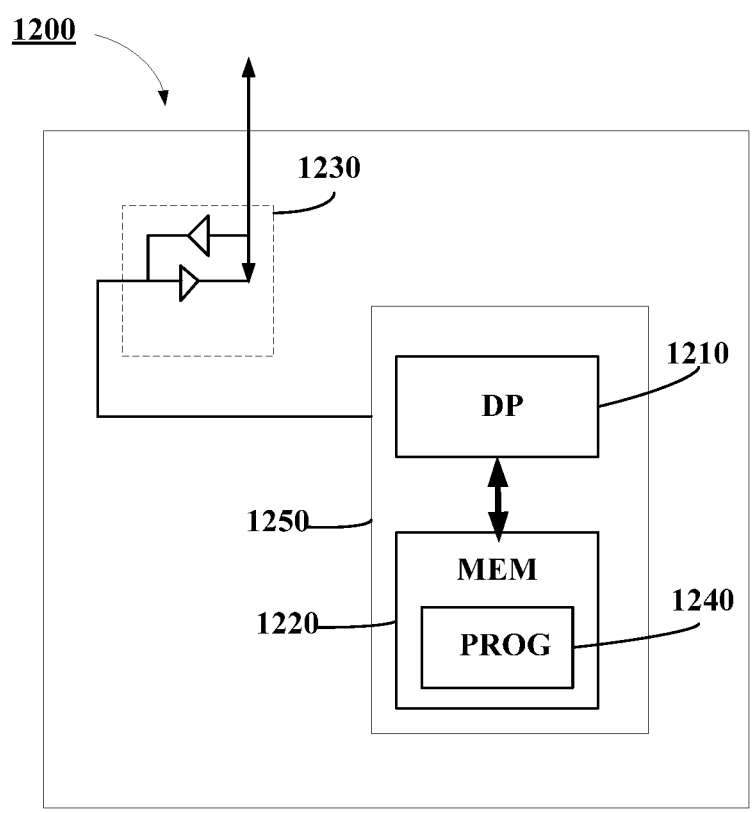
FIG. 12 is a simplified block diagram of a device that is suitable for implementing embodiments of the present disclosure.

FIG. 12 shows a simplified block diagram of a device 1200 that is suitable for implementing embodiments of the present disclosure. It would be appreciated that the device 1200 may be implemented as at least a part of, for example, the network device 101 or the terminal device 102.

As shown, the device 1200 includes a communicating means 1230 and a processing means 1250. The processing means 1250 includes a data processor (DP) 1210, a memory (MEM) 1220 coupled to the DP 1210. The communicating means 1230 is coupled to the DP 1210 in the processing means 1250. The MEM 1220 stores a program (PROG) 1240. The communicating means 1230 is for communications with other devices, which may be implemented as a transceiver for transmitting/receiving signals.

In some embodiments where the device 1200 acts as a network device. For example, the memory 1220 stores a plurality of instructions; and the processor 1210 coupled to the memory 1220 and configured to execute the instructions to: determine first configuration information on mapping of one or more code blocks to a code block group according to a service and/or an associated channel; and determine second configuration information on mapping of the code block group to one or more time-frequency resources.

In some other embodiments where the device 1200 acts as a terminal device. For example, the memory 1220 stores a plurality of instructions; and the processor 1210 coupled to the memory 1220 and configured to execute the instructions to: receive first configuration information on mapping of one or more code blocks to a code block group from a first device; the first configuration information is determined by the first device according to a service and/or an associated channel.

The PROG 1240 is assumed to include program instructions that, when executed by the associated DP 1210, enable the device 1200 to operate in accordance with the embodiments of the present disclosure, as discussed herein with the method 200, 300, 400, or 900. The embodiments herein may be implemented by computer software executable by the DP 1210 of the device 1200, or by hardware, or by a combination of software and hardware. A combination of the data processor 1210 and MEM 1220 may form processing means 1250 adapted to implement various embodiments of the present disclosure.

The MEM 1220 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 1200, there may be several physically distinct memory modules in the device 1200. The DP 1210 may be of any type suitable to the local technical environment, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method in a first device, comprising:
   determining first configuration information on mapping of one or more code blocks to a code block group according to a service and/or an associated channel;
   determining second configuration information on mapping of the code block group to one or more time-frequency resources; and transmitting the first configuration information and/or the second configuration information to a second device;
wherein a granularity of a code block group is determined to adjust the mapping of the code block and the code block group, the granularity of the code block group is determined based on the importance of data to be transmitted, and a code block group comprising important data has a smaller granularity than a code block group comprising less important data.

2. A method in a first device, the method comprising:
determining first configuration information on mapping of one or more code blocks to a code block group according to a service and/or an associated channel; and
determining second configuration information on mapping of the code block group to one or more time-frequency resources;
wherein one or more of the following information is determined to adjust the mapping of the code block and the code block group:
the number of feedback bits;
a granularity of a code block;
a granularity of a code block group;
the number of the code block groups in a transport block; and
the number of the code blocks in a code block group.

3. The method according to claim 1, wherein the method further comprises:
mapping one or more code blocks of a transport block to one or more code block groups according to the first configuration information; and/or
mapping the one or more code block groups to one or more time-frequency resources according to the second configuration information.

4. The method according to claim 2, wherein the method further comprises:
transmitting the first configuration information and/or the second configuration information to a second device.

5. The method according to claim 4, wherein the granularity of the code block group is determined based on configuration of the associated channel; or wherein the granularity of the code block group is determined based on configuration of the service corresponding to the code blocks.

6. The method according to claim 5, wherein the configuration of the associated channel comprises a channel capacity and/or a channel type; wherein the configuration of the service comprises a service type and/or a multiplexing status of the services.

7. The method according to claim 1, wherein the mapping of the code block and the code block group is determined based on an experienced channel condition;
or wherein the mapping of the code block and the code block group is determined according to a priority of the code block.

8. The method according to claim 1, wherein a first code block group and a second code block group are determined respectively; and a first rule is defined for the first code block group and a second rule is defined for the second code block group.

9. The method according to claim 1, wherein each code block group is mapped to an integer number of orthogonal frequency division multiplexing (OFDM) symbols in time domain.

10. The method according to claim 3, wherein the method further comprises:
segmenting information bits of the transport block for each code block group; or segmenting one or more time-frequency resources for each code block group.

11. The method according to claim 1, wherein the method further comprises:
transmitting feedback information of a data transmission according to the mapping of the code block and the code block group, and/or, the mapping of the code block groups and the time-frequency resource.

12. The method according to claim 1, wherein the associated channel comprises a physical uplink control channel or a physical downlink control channel.

13. A method in a second device, comprising:
receiving first configuration information on mapping of one or more code blocks to a code block group from a first device;
wherein the first configuration information is determined by the first device according to a service and/or an associated channel;
wherein one or more of the following information is determined by the first device to adjust the mapping of the code block and the code block group:
the number of feedback bits;
a granularity of a code block;
a granularity of a code block group;
the number of the code block groups in a transport block; and
the number of the code blocks in a code block group.

14. The method according to claim 13, wherein the method further comprises:
receiving second configuration information on mapping of the code block group to one or more time-frequency resources from the first device.

15. The method according to claim 14, wherein the method further comprises:
mapping one or more code blocks of a transport block to one or more code block groups according to the first configuration information; and/or
mapping the one or more code block groups to one or more time-frequency resources according to the second configuration information.

16. The method according to claim 15, wherein the method further comprises:
segmenting information bits of the transport block for each code block group; or segmenting one or more time-frequency resources for each code block group.

17. The method according to claim 13, wherein the method further comprises:
transmitting feedback information of a data transmission according to the mapping of the code block and the code block group, and/or, the mapping of the code block groups and the time-frequency resource.

18. The method according to claim 13, wherein the associated channel comprises a physical uplink control channel or a physical downlink control channel.

19. A first device, comprising a processor and a memory, wherein the memory containing instructions executable by the processor whereby the first device is operative to:
perform the method according to claim 1.

20. The method according to claim 13, wherein the granularity of the code block group is determined by the first device to adjust the mapping of the code block and the code block group, the granularity of the code block group is determined based on the importance of data to be transmitted, and a code block group comprising important data has a smaller granularity than a code block group comprising less important data.

* * * * *